(12) United States Patent
Muharemovic et al.

(10) Patent No.: US 9,363,054 B2
(45) Date of Patent: *Jun. 7, 2016

(54) SOUNDING REFERENCE SIGNAL USER EQUIPMENT SPECIFIC SUB-FRAME CONFIGURATION

(75) Inventors: Tarik Muharemovic, Dallas, TX (US); Zukang Shen, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 835 days.

This patent is subject to a terminal disclaimer.

(21) Appl. No.: 12/412,030

(22) Filed: Mar. 26, 2009

(65) Prior Publication Data

US 2009/0274076 A1 Nov. 5, 2009

Related U.S. Application Data

(60) Provisional application No. 61/048,746, filed on Apr. 29, 2008, provisional application No. 61/051,457, filed on May 8, 2008, provisional application No. 61/052,356, filed on May 12, 2008.

(51) Int. Cl.
*H04L 5/00* (2006.01)
*H04W 72/12* (2009.01)

(52) U.S. Cl.
CPC ............ *H04L 5/0048* (2013.01); *H04L 5/0039* (2013.01); *H04L 5/0094* (2013.01); *H04W 72/1263* (2013.01)

(58) Field of Classification Search
USPC ......... 370/203, 276, 280–282, 294, 295, 310, 370/310.2, 312, 314, 319, 321, 326–329, 370/336, 337, 340–344, 345, 347, 431, 370/442; 455/39, 179.1, 343.4, 509, 516, 455/524
See application file for complete search history.

(56) References Cited

U.S. PATENT DOCUMENTS

2009/0042616 A1* 2/2009 Teo et al. .................. 455/562.1

OTHER PUBLICATIONS

3GPP TS 36.211 V8.2.0. , May 3, 2008.
3GPP R1-080900, "Physical-layer parameters to be configured by RRC," Ericsson , Feb. 2008.
3GPP TS 36.213 V8.2.0. , May 3, 2008.

* cited by examiner

*Primary Examiner* — Brandon Renner
*Assistant Examiner* — Prince A Mensah
(74) *Attorney, Agent, or Firm* — Ronald O. Neerings; Frank D. Cimino

(57) ABSTRACT

A method of wireless communication including a plurality of fixed basestations and a plurality of mobile user equipment with each basestation transmitting to any user equipment within a corresponding cell a sounding reference signal sub-frame configuration indicating sub-frames when sounding is permitted. Each user equipment recognizes the sounding reference signal sub-frame configuration and sounds only at permitted sub-frames. Differing user equipment may have differing sounding reference signal sub-frame configurations. There are numerous manners to encode the transmitted information.

15 Claims, 4 Drawing Sheets

SOUNDING REFERENCE SIGNAL USER EQUIPMENT SPECIFIC SUB-FRAME CONFIGURATION

CLAIM OF PRIORITY

This application claims priority under 35 U.S.C. 119(e)(1) to U.S. Provisional Application No. 61/048,746 filed Apr. 29, 2008, U.S. Provisional Application No. 61/051,457 filed May 8, 2008 and U.S. Provisional Application No. 61/052,356 filed May 12, 2009.

TECHNICAL FIELD OF THE INVENTION

The technical field of this invention is wireless communication.

BACKGROUND OF THE INVENTION

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UE's data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

FIG. 2 shows the Evolved Universal Terrestrial Radio Access (E-UTRA) time division duplex (TDD) Frame Structure. Different sub-frames are allocated for downlink (DL) or uplink (UL) transmissions. Table 1 shows applicable DL/UL sub-frame allocations.

TABLE 1

| Config-uration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| Config-uration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

SUMMARY OF THE INVENTION

A method of wireless communication including a plurality of fixed basestations and a plurality of mobile user equipment with each basestation transmitting to any user equipment within a corresponding cell a sounding reference signal sub-frame configuration indicating sub-frames when sounding is permitted. Each user equipment recognizes the sounding reference signal sub-frame configuration and sounds only at permitted sub-frames. Differing user equipment may have differing sounding reference signal sub-frame configurations. There are numerous manners to encode the transmitted information.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
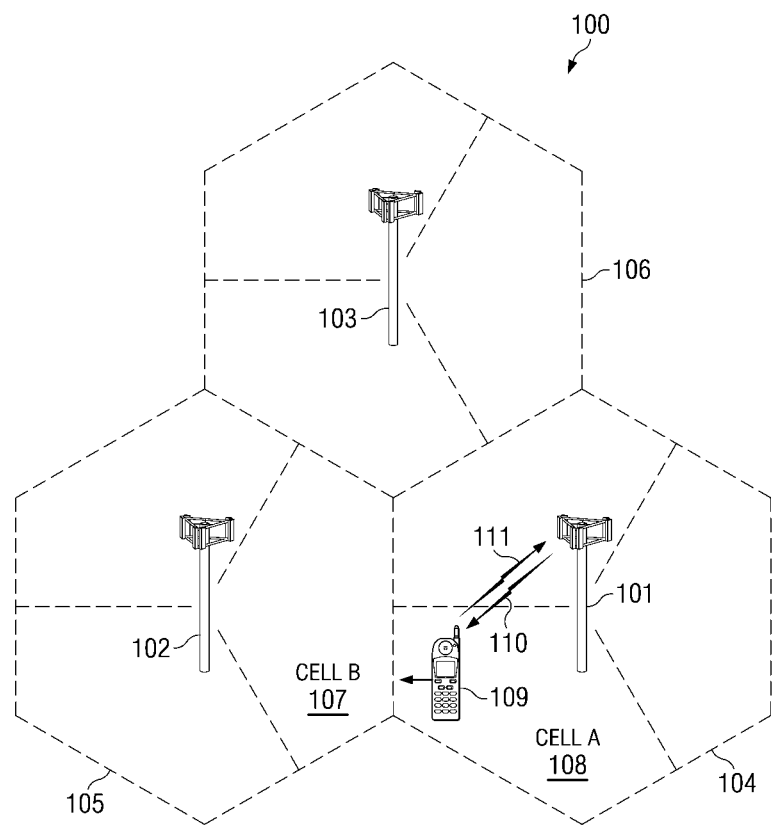
FIG. 1 is a diagram of a communication system of the prior art related to this invention having three cells.
Figure 2:
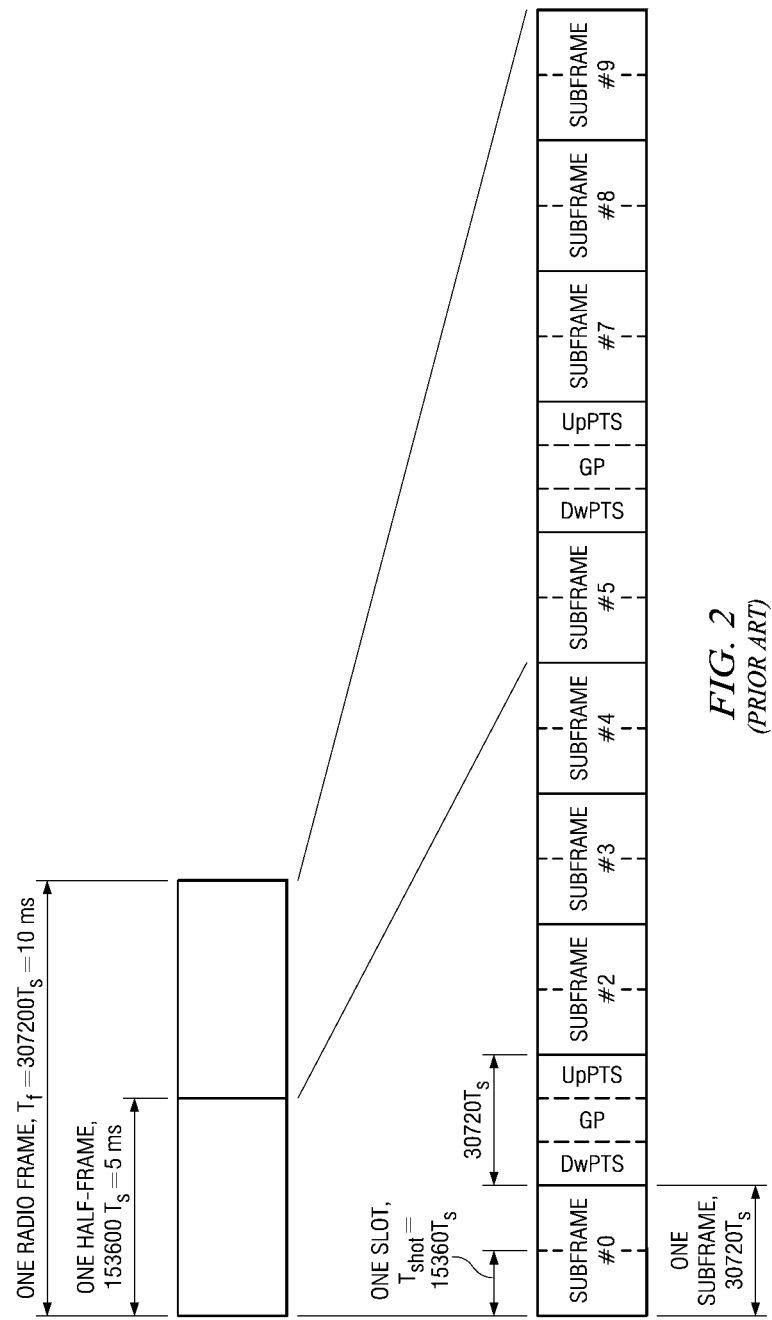
FIG. 2 shows the Evolved Universal Terrestrial Radio Access (E-UTRA) TDD Frame Structure of the prior art.

Sounding involves exchange of signals between the base station and the connected UE. Each sounding uses a reference resource identifier selected from an available reference resource identifier map h(t, L) and a portion of the spectrum selected from an available spectrum identifier map f(t, N); where L is a group of shared parameters signaled to each UE from the group; and N is a group of shared parameters signaled to each UE from the group. Some examples utilize CAZAC sequences as the reference sequences. CAZAC sequences are complex-valued sequences with: constant amplitude (CA); and zero cyclic autocorrelation (ZAC). Examples of CAZAC sequences include: Chu sequences, Frank-Zadoff sequences, Zadoff-Chu (ZC) sequences and generalized chirp-like (GCL) sequences. CAZAC (ZC or otherwise) sequences are presently preferred.

In this invention each basestation 101, 102 and 103 transmits a sounding reference signal (SRS) to connected UEs 109. The UE receiving the SRS then conducts sounding in accordance with the SRS sub-frame configuration. In accordance with this invention each UE may operate on a different SRS sounding sub-frame configuration.

The SRS sub-frame configuration is broadcast by basestation 101 in a System Information Block (SIB). This sub-frame configuration indicates which sub-frames are SRS sub-frames. Broadcast of the SRS sub-frame configuration is useful even for UEs 109 which do not transmit any SRS. SRS shouldn't collide with physical uplink shared channel (PUSCH) transmission. Thus non-SRS UEs 109 can extract some of their silent symbol periods from the SRS sub-frame configuration. These silent periods are useful for performing some measurements at UE 109. In general each cell 107 and 108 would employ a different SRS sub-frame configuration. Ideally, basestations 101, 102 and 103 would select SRS sub-frame configurations to minimize cross-cell interference.

There are two main ways of signaling and interpreting the SRS sub-frame configuration parameters. Sub-frame configuration can be defined by two parameters: the periodicity $T_{SFC}$; and the offset $\Delta_{SFC}$. Both UEs 109 and basestation 101 keep a sub-frame counter $C_{SFC}$ permitting UE 109 and basestation 101 to determine which sub-frames are configured for SRS transmission. A sub-frame is an SRS sub-frame if and only if $\Delta_{SFC}=(C_{SFC}) \bmod T_{SFC}$. The exact range of values of $\Delta_{SFC}$ and $T_{SFC}$ need to be defined with the number of bits and encoding for each. For example, $T_{SFC}$ could be selected from the set $\{1, 2, 3, 4, 5, \ldots, 32\}$ allowing flexible system deployment $\Delta_{SFC}$ could be selected from the same set. This yields maximum flexibility, but requires 10 bits of broadcast SIB signaling, which can be very costly. A reduced overhead alternative encodes and signals $T_{SFC}$ first. This requires greatest integer in $\log_2 (T_{SFC})$ (ceil $[\log_2 (T_{SFC})]$) bits. The bits required for $\Delta_{SFC}$ would be either the ceil$[\log_2(T_{SFC})]$ or the least integer in $\log_2 (T_{SFC})$ (floor $[\log_2 (T_{SFC})]$) because $0 \leq \Delta_{SFC} < T_{SFC}$. This reduces the number of required bits for signaling $\Delta_{SFC}$, but only for certain scenarios where $T_{SFC}$ is small. Another reduced overhead alternative hard codes a value for $\Delta_{SFC}$ such as zero. In that case, only $T_{SFC}$ is signaled.

Several examples of combined $T_{SFC}$, $\Delta_{SFC}$ coding are listed in the following tables. In these examples the SRS sub-frame configuration is encoded using either 4 or 5 bits in SIB using joint source coding in $T_{SFC}$ and $\Delta_{SFC}$. Thus a unique 4 or 5 bit combination maps into a particular pair ($T_{SFC}$, $\Delta_{SFC}$).

Table 2 lists a 4 bit example suitable for use in frequency division duplex (FDD) systems.

TABLE 2

| Decimal | Binary | $T_{SFC}$ | $\Delta_{SFC}$ |
|---|---|---|---|
| 0 | 0000 | 1 | 0 |
| 1 | 0001 | 2 | 0 |
| 2 | 0010 | 2 | 1 |
| 3 | 0011 | 5 | 0 |
| 4 | 0100 | 5 | 1 |
| 5 | 0101 | 5 | 2 |
| 6 | 0110 | 10 | 0 |
| 7 | 0111 | 10 | 1 |
| 8 | 1000 | 10 | 2 |
| 9 | 1001 | 20 | 0 |
| 10 | 1010 | 20 | 1 |
| 11 | 1011 | 20 | 2 |
| 12 | 1100 | 40 | 0 |
| 13 | 1101 | 40 | 1 |
| 14 | 1110 | 40 | 2 |
| 15 | 1111 | Inf. | NA |

In Table 2 a coding of decimal 15 indicates no SRS thus $T_{SFC}$ is infinite, $\Delta_{SFC}$ is meaningless and not applicable (NA).

Table 3 lists another 4 bit example suitable for use in FDD systems.

TABLE 3

| Decimal | Binary | $T_{SFC}$ | $\Delta_{SFC}$ |
|---|---|---|---|
| 0 | 0000 | 1 | 0 |
| 1 | 0001 | 2 | 0 |
| 2 | 0010 | 2 | 1 |
| 3 | 0011 | 5 | 2 |
| 4 | 0100 | 5 | 3 |
| 5 | 0101 | 5 | 4 |
| 6 | 0110 | 10 | 5 |
| 7 | 0111 | 10 | 6 |
| 8 | 1000 | 10 | 7 |
| 9 | 1001 | 20 | 8 |
| 10 | 1010 | 20 | 9 |
| 11 | 1011 | 20 | 10 |
| 12 | 1100 | 40 | 11 |
| 13 | 1101 | 40 | 12 |
| 14 | 1110 | 40 | 13 |
| 15 | 1111 | Inf. | NA |

In Table 3 a coding of decimal 15 indicates no SRS thus $T_{SFC}$ is infinite, $\Delta_{SFC}$ is meaningless and not applicable (NA).

Table 4 lists a 5 bit example suitable for use in FDD systems.

TABLE 4

| Decimal | Binary | $T_{SFC}$ | $\Delta_{SFC}$ |
|---|---|---|---|
| 0 | 00000 | 1 | 0 |
| 1 | 00001 | 2 | 0 |
| 2 | 00010 | 2 | 1 |
| 3 | 00011 | 5 | 0 |
| 4 | 00100 | 5 | 1 |
| 5 | 00101 | 5 | 2 |
| 6 | 00110 | 5 | 3 |
| 7 | 00111 | 5 | 4 |
| 8 | 01000 | 10 | 0 |
| 9 | 01001 | 10 | 1 |
| 10 | 01010 | 10 | 2 |
| 11 | 01011 | 10 | 3 |
| 12 | 01100 | 10 | 4 |
| 13 | 01101 | 10 | 5 |
| 14 | 01110 | 10 | 6 |
| 15 | 01111 | 20 | 0 |
| 16 | 10000 | 20 | 1 |
| 17 | 10001 | 20 | 2 |
| 18 | 10010 | 20 | 3 |
| 19 | 10011 | 20 | 4 |
| 20 | 10100 | 20 | 5 |
| 21 | 10101 | 20 | 6 |
| 22 | 10110 | 40 | 0 |
| 23 | 10111 | 40 | 1 |
| 24 | 11000 | 40 | 2 |
| 25 | 11001 | 40 | 3 |
| 26 | 11010 | 40 | 4 |
| 27 | 11011 | 40 | 5 |
| 28 | 11100 | 40 | 6 |
| 29 | 11101 | Optional | |
| 30 | 11110 | Optional | |
| 31 | 11111 | Inf. | NA |

In Table 4 codings decimal 29 and 30 are optional and not defined in this example. In Table 4 a coding of decimal 31 indicates no SRS thus $T_{SFC}$ is infinite, $\Delta_{SFC}$ is meaningless and not applicable (NA).

Table 5 lists another 5 bit example suitable for use in FDD systems.

TABLE 5

| Decimal | Binary | $T_{SFC}$ | $\Delta_{SFC}$ |
|---|---|---|---|
| 0 | 00000 | 1 | 0 |
| 1 | 00001 | 2 | 0 |
| 2 | 00010 | 2 | 1 |

TABLE 5-continued

| Decimal | Binary | $T_{SFC}$ | $\Delta_{SFC}$ |
|---|---|---|---|
| 3 | 00011 | 5 | 0 |
| 4 | 00100 | 5 | 1 |
| 5 | 00101 | 5 | 2 |
| 6 | 00110 | 5 | 3 |
| 7 | 00111 | 5 | 4 |
| 8 | 01000 | 10 | 0 |
| 9 | 01001 | 10 | 1 |
| 10 | 01010 | 10 | 2 |
| 11 | 01011 | 10 | 3 |
| 12 | 01100 | 10 | 4 |
| 13 | 01101 | 10 | 5 |
| 14 | 01110 | 10 | 6 |
| 15 | 01111 | 10 | 7 |
| 16 | 10000 | 20 | 0 |
| 17 | 10001 | 20 | 1 |
| 18 | 10010 | 20 | 2 |
| 19 | 10011 | 20 | 3 |
| 20 | 10100 | 20 | 4 |
| 21 | 10101 | 20 | 5 |
| 22 | 10110 | 20 | 6 |
| 23 | 10111 | 20 | 7 |
| 24 | 11000 | 40 | 0 |
| 25 | 11001 | 40 | 1 |
| 26 | 11010 | 40 | 2 |
| 27 | 11011 | 40 | 3 |
| 28 | 11100 | 40 | 4 |
| 29 | 11101 | 40 | 5 |
| 30 | 11110 | 40 | 6 |
| 31 | 11111 | Inf. | NA |

In Table 5 a coding of decimal 31 indicates no SRS thus $T_{SFC}$ is infinite, $\Delta_{SFC}$ is meaningless and not applicable (NA).

Table 6 lists another 5 bit example suitable for use in FDD systems.

TABLE 6

| Decimal | Binary | $T_{SFC}$ | $\Delta_{SFC}$ |
|---|---|---|---|
| 0 | 00000 | 1 | 0 |
| 1 | 00001 | 2 | 0 |
| 2 | 00010 | 2 | 1 |
| 3 | 00011 | 5 | 0 |
| 4 | 00100 | 5 | 1 |
| 5 | 00101 | 5 | 2 |
| 6 | 00110 | 5 | 3 |
| 7 | 00111 | 5 | 4 |
| 8 | 01000 | 10 | 3 |
| 9 | 01001 | 10 | 4 |
| 10 | 01010 | 10 | 5 |
| 11 | 01011 | 10 | 6 |
| 12 | 01100 | 10 | 7 |
| 13 | 01101 | 10 | 8 |
| 14 | 01110 | 10 | 9 |
| 15 | 01111 | 20 | 10 |
| 16 | 10000 | 20 | 11 |
| 17 | 10001 | 20 | 12 |
| 18 | 10010 | 20 | 13 |
| 19 | 10011 | 20 | 14 |
| 20 | 10100 | 20 | 15 |
| 21 | 10101 | 20 | 16 |
| 22 | 10110 | 40 | 17 |
| 23 | 10111 | 40 | 18 |
| 24 | 11000 | 40 | 19 |
| 25 | 11001 | 40 | 20 |
| 26 | 11010 | 40 | 21 |
| 27 | 11011 | 40 | 22 |
| 28 | 11100 | 40 | 23 |
| 29 | 11101 | Optional | |
| 30 | 11110 | Optional | |
| 31 | 11111 | Inf. | NA |

In Table 6 codings decimal 29 and 30 are optional and not defined in this example. In Table 6 a coding of decimal 31 indicates no SRS thus $T_{SFC}$ is infinite, $\Delta_{SFC}$ is meaningless and not applicable (NA).

Table 7 lists a 4 bit example suitable for use in time division duplex (TDD) systems.

TABLE 7

| Decimal | Binary | $T_{SFC}$ | $\Delta_{SFC}$ |
|---|---|---|---|
| 0 | 0000 | 1 | 0 |
| 1 | 0001 | 5 | 1 (a) |
| 2 | 0010 | 5 | 1 (b) |
| 3 | 0011 | 5 | 2 |
| 4 | 0100 | 10 | 0 |
| 5 | 0101 | 10 | 1 (a) |
| 6 | 0110 | 10 | 1 (b) |
| 7 | 0111 | 10 | 2 |
| 8 | 1000 | 20 | 0 |
| 9 | 1001 | 20 | 1 (a) |
| 10 | 1010 | 20 | 1 (b) |
| 11 | 1011 | 20 | 2 |
| 12 | 1100 | 40 | 0 |
| 13 | 1101 | 40 | 1 (a) |
| 14 | 1110 | 40 | 1 (b) |
| 15 | 1111 | Inf. | NA |

In Table 7 codings decimal 1, 2, 5, 6, 9, 10, 13 and 14 are encoded with respect to Uplink Pilot Transmission Slot (UpPTS) orthogonal frequency division multiplexing (OFDM) symbols. If UpPTS contains two OFDM symbols: 1(a) means the first OFDM symbol is used for SRS to determine $\Delta_{SFC}$; and 1(b) means the second of OFDM symbol is used for SRS to determine $\Delta_{SFC}$. In Table 7 a coding of decimal 15 indicates no SRS thus $T_{SFC}$ is infinite, $\Delta_{SFC}$ is meaningless and not applicable (NA).

Table 8 lists a 5 bit example suitable for use in TDD systems.

TABLE 8

| Decimal | Binary | $T_{SFC}$ | $\Delta_{SFC}$ |
|---|---|---|---|
| 0 | 00000 | 1 | 0 |
| 1 | 00001 | 5 | 1 (a) |
| 2 | 00010 | 5 | 1 (b) |
| 3 | 00011 | 5 | 1 (a) + 1 (b) |
| 4 | 00100 | 5 | 2 |
| 5 | 00101 | 5 | 3 |
| 6 | 00110 | 5 | 4 |
| 7 | 00111 | 10 | 1 (a) |
| 8 | 01000 | 10 | 1 (b) |
| 9 | 01001 | 10 | 1 (a) + 1 (b) |
| 10 | 01010 | 10 | 2 |
| 11 | 01011 | 10 | 3 |
| 12 | 01100 | 10 | 4 |
| 13 | 01101 | 10 | 7 |
| 14 | 01110 | 10 | 8 |
| 15 | 01111 | 20 | 1 (a) |
| 16 | 10000 | 20 | 1 (b) |
| 17 | 10001 | 20 | 1 (a) + 1 (b) |
| 18 | 10010 | 20 | 2 |
| 19 | 10011 | 20 | 3 |
| 20 | 10100 | 20 | 4 |
| 21 | 10101 | 20 | 7 |
| 22 | 10110 | 20 | 8 |
| 23 | 10111 | 40 | 1 (a) |
| 24 | 11000 | 40 | 1 (b) |
| 25 | 11001 | 40 | 1 (a) + 1 (b) |
| 26 | 11010 | 40 | 2 |
| 27 | 11011 | 40 | 3 |
| 28 | 11100 | 40 | 4 |
| 29 | 11101 | 40 | 7 |
| 30 | 11110 | 40 | 8 |
| 31 | 11111 | Inf. | NA |

In Table 8 codings decimal 1, 2, 3, 7, 8, 9, 15, 16, 17, 23, 24 and 25 are encoded with respect to UpPTS OFDM symbols. If UpPTS contains two OFDM symbols: 1(a) means the first OFDM symbol is used for SRS to determine $\Delta_{SFC}$; 1(b)

means the second of OFDM symbol is used for SRS to determine $\Delta_{SFC}$; and 1(a)+1(b) means that both OFDM symbols are used for SRS to determine $\Delta_{SFC}$. In Table 8 a coding of decimal 31 indicates no SRS thus $T_{SFC}$ is infinite, $\Delta_{SFC}$ is meaningless and not applicable (NA). For TDD, if the SRS sub-frame period is 1, all UL sub-frames and UpPTS can contain SRS. If UpPTS is used for short random access channel (RACH) transmission in some sub-frames, then there is no SRS. Thus basestation 101 does not assign any SRS UEs in RACH UpPTS sub-frames.

Table 9 lists another 5 bit example suitable for use in TDD systems.

TABLE 9

| Decimal | Binary | $T_{SFC}$ | $\Delta_{SFC}$ |
|---|---|---|---|
| 0 | 00000 | 1 | 0 |
| 1 | 00001 | 5 | 1 (a) |
| 2 | 00010 | 5 | 1 (b) |
| 3 | 00011 | 5 | 1 (a) + 1 (b) |
| 4 | 00100 | 5 | 2 |
| 5 | 00101 | 5 | 3 |
| 6 | 00110 | 5 | 4 |
| 7 | 00111 | 10 | 1 (a) |
| 8 | 01000 | 10 | 1 (b) |
| 9 | 01001 | 10 | 1 (a) + 1 (b) |
| 10 | 01010 | 10 | 2 |
| 11 | 01011 | 10 | 3 |
| 12 | 01100 | 10 | 6 (a) |
| 13 | 01101 | 10 | 6 (b) |
| 14 | 01110 | 10 | 6 (a) + 6 (b) |
| 15 | 01111 | 20 | 1 (a) |
| 16 | 10000 | 20 | 1 (b) |
| 17 | 10001 | 20 | 1 (a) + 1 (b) |
| 18 | 10010 | 20 | 2 |
| 19 | 10011 | 20 | 3 |
| 20 | 10100 | 20 | 6 (a) |
| 21 | 10101 | 20 | 6 (b) |
| 22 | 10110 | 20 | 6 (a) + 6 (b) |
| 23 | 10111 | 40 | 1 (a) |
| 24 | 11000 | 40 | 1 (b) |
| 25 | 11001 | 40 | 1 (a) + 1 (b) |
| 26 | 11010 | 40 | 2 |
| 27 | 11011 | 40 | 3 |
| 28 | 11100 | 40 | 6 (a) |
| 29 | 11101 | 40 | 6 (b) |
| 30 | 11110 | 40 | 6 (a) + 6 (b) |
| 31 | 11111 | Inf. | NA |

In Table 9 codings decimal 1, 2, 3, 7, 8, 9, 12 to 17, 20 to 25, 28, 29 and 30 are encoded with respect to UpPTS OFDM symbols. If UpPTS contains two OFDM symbols: 1(a) means the first OFDM symbol is used for SRS to determine $\Delta_{SFC}$; 1(b) means the second of OFDM symbol is used for SRS to determine $\Delta_{SFC}$; and 1(a)+1(b) means that both OFDM symbols are used for SRS to determine $\Delta_{SFC}$. In Table 8 a coding of decimal 31 indicates no SRS thus $T_{SFC}$ is infinite, $\Delta_{SFC}$ is meaningless and not applicable (NA).

Table 10 lists another 4 bit example suitable for use in FDD systems. Sounding reference signal sub-frames are the sub-frames satisfying $\lfloor n_s/2 \rfloor \mod T_{SFC} \in \Delta_{SFC}$.

TABLE 10

| Decimal | Binary | $T_{SFC}$ | $\Delta_{SFC}$ |
|---|---|---|---|
| 0 | 0000 | 1 | 0 |
| 1 | 0001 | 2 | 0 |
| 2 | 0010 | 2 | 1 |
| 3 | 0011 | 5 | 0 |
| 4 | 0100 | 5 | 1 |
| 5 | 0101 | 5 | 2 |
| 6 | 0110 | 5 | 3 |

TABLE 10-continued

| Decimal | Binary | $T_{SFC}$ | $\Delta_{SFC}$ |
|---|---|---|---|
| 7 | 0111 | 5 | 0, 1 |
| 8 | 1000 | 5 | 2, 3 |
| 9 | 1001 | 10 | 0 |
| 10 | 1010 | 10 | 1 |
| 11 | 1011 | 10 | 2 |
| 12 | 1100 | 10 | 3 |
| 13 | 1101 | 10 | 0, 1, 2, 3, 4, 6, 8 |
| 14 | 1110 | 10 | 0, 1, 2, 3, 4, 5, 6, 8 |
| 15 | 1111 | reserved | reserved |

Table 11 lists another 4 bit example suitable for use in TDD systems. Sounding reference signal sub-frames are the sub-frames satisfying $\lfloor n_s/2 \rfloor \mod T_{SFC} \in \Delta_{SFC}$. Sounding reference signals are transmitted only in configured UL sub-frames or UpPTS.

TABLE 11

| Decimal | Binary | $T_{SFC}$ | $\Delta_{SFC}$ |
|---|---|---|---|
| 0 | 0000 | 5 | 1 |
| 1 | 0001 | 5 | 1, 2 |
| 2 | 0010 | 5 | 1, 3 |
| 3 | 0011 | 5 | 1, 4 |
| 4 | 0100 | 5 | 1, 2, 3 |
| 5 | 0101 | 5 | 1, 2, 4 |
| 6 | 0110 | 5 | 1, 3, 4 |
| 7 | 0111 | 5 | 1, 2, 3, 4 |
| 8 | 1000 | 10 | 1, 2, 6 |
| 9 | 1001 | 10 | 1, 3, 6 |
| 10 | 1010 | 10 | 1, 6, 7 |
| 11 | 1011 | 10 | 1, 2, 6, 8 |
| 12 | 1100 | 10 | 1, 3, 6, 9 |
| 13 | 1101 | 10 | 1, 4, 6, 7 |
| 14 | 1110 | reserved | reserved |
| 15 | 1111 | reserved | reserved |

For TDD, a SRS sub-frame period of 1 means that all UL sub-frames and UpPTS can contain SRS. If UpPTS is used for short RACH transmission in some sub-frames, then there is no SRS. Thus basestation 101 does not assign any SRS UEs in RACH UpPTS sub-frames. For TDD, it is not clear how to have SRS sub-frame configuration with period 2.

Figure 3:
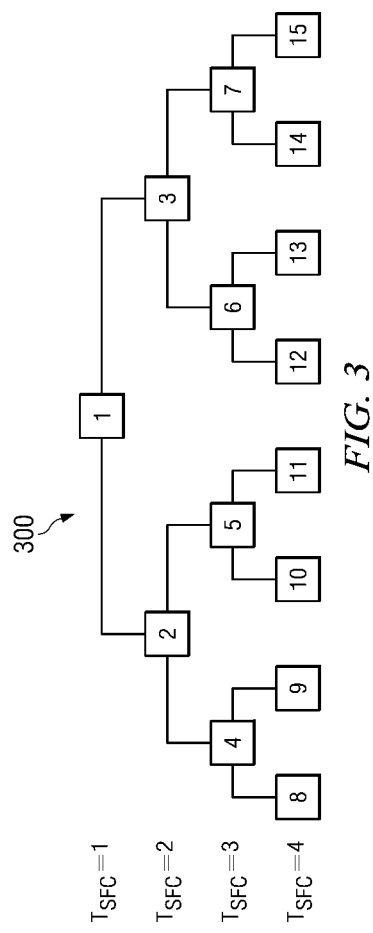
FIG. 3 illustrates a first example binary tree used in encoding.

Broadcasting both $\Delta_{SFC}$ and $T_{SFC}$ supports flexible SRS sub-frame configuration. Different values of $\Delta_{SFC}$ can be assigned in different cells. Thus SRS transmission in one cell does not interfere with a neighboring cells. Because the set of UL sub-frames varies with DL/UL sub-frame configuration, $\Delta_{SFC}$ is needed for SRS sub-frame configuration in TDD. Note binary tree 300 illustrates in FIG. 3 is just an example. Different trees can be used with different depths and configurations and different joint source-encodings of ($\Delta_{SFC}$, $T_{SFC}$).

FIG. 3 illustrates a manner of jointly encoding $\Delta_{SFC}$ and $T_{SFC}$ with an efficient source code to support multiple values for the offset $\Delta_{SFC}$ for each $T_{SFC}$ using an underlying structure. FIG. 3 illustrates a binary tree based structure 300. Binary tree 300 has exactly $2^x-1$ nodes, where x is 4 in this example. Identifying any point on the binary tree requires exactly x bits, 4 bits in this example. A reserved codeword may be defined meaning no SRS, for example. Each node in the binary tree is assigned a mapping to a pair of ($\Delta_{SFC}$, $T_{SFC}$). The simplest mapping is that nodes at a certain depth are assigned a unique value of $T_{SFC}$. Referring to FIG. 3, for node 1 $T_{SFC}=L$, for nodes (2, 3) $T_{SFC}=2$, for nodes (4, 5, 6, 7) $T_{SFC}=3$, and for nodes (8, 9, 10, 11, 12, 13, 14 and 15) $T_{SFC}=3$. Thus the depth identifies $T_{SFC}$. In this example offset $\Delta_{SFC}$ is derived from the value of the node mod $T_{SFC}$. Such code is even simpler if we consider binary values for labeled nodes. The position of the most significant 1 bit in the binary value of a node equals the value of $T_{SFC}$. This is illustrated in FIG. 3. The remaining less significant bits identify offset $\Delta_{SFC}$. This same binary code can be used to encode frequency position (offset and bandwidth) of SRS.

Figure 4:
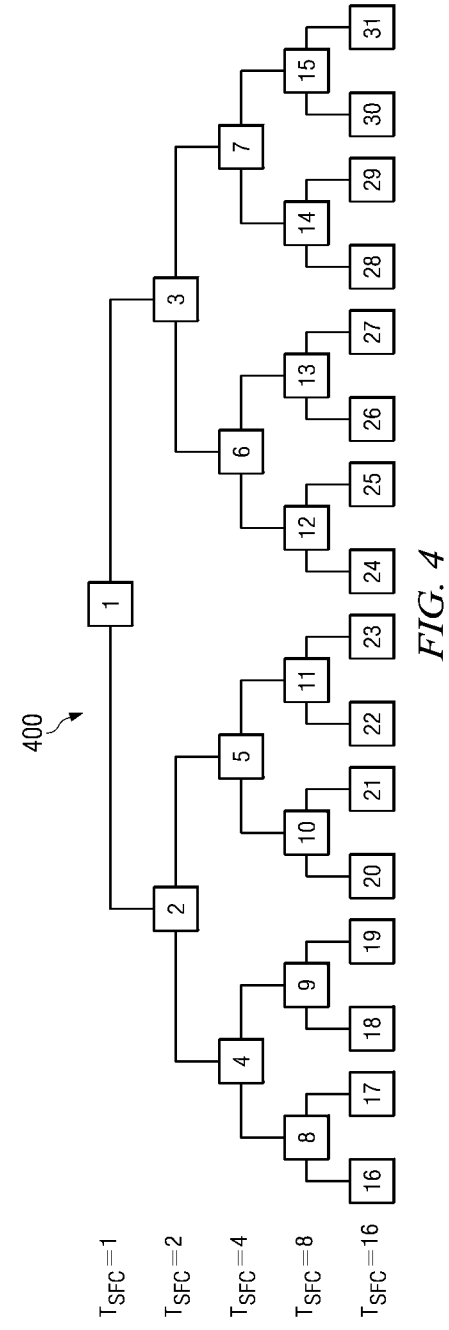
FIG. 4 illustrates a second example binary tree used in encoding.

FIG. 4 illustrates another embodiment of this invention. Binary tree 400 illustrated in FIG. 4 identifies sub-frames having periodicities $T_{SFC}$ of (1, 2, 4, 8, 16) ms. Each node in binary tree 400 is mapped to a pair of ($\Delta_{SFC}$, $T_{SFC}$). The simplest mapping assigns a unique value of $T_{SFC}$ to all nodes at a certain depth. FIG. 4 illustrates this assignment. A simple 5-bit code identifies the node. The position of most significant 1 identifies $T_{SFC}$ as $2^{(N-1)}$. The remaining bits identify the offset $\Delta_{SFC}$. If all 0 is signaled (00000), this identifies no SRS (infinity) or alternatively a one-shot SRS.

In another embodiment of the invention, the pair ($\Delta_{SFC}$, $T_{SFC}$) is coded jointly (source encoding) and broadcast in the SIB. In this embodiment the tree structure is not necessary. For example, if $T_{SFC}$ takes on values from the set (1, 2, 4, 5, 10) ms, then there are 1+2+4+5+10=22 possible values for the combination ($\Delta_{SFC}$, $T_{SFC}$). Each one of these combinations is mapped to a unique number Y out 22 numbers and can be represented by 5 bits. Broadcasting the unique number identifies the ($\Delta_{SFC}$, $T_{SFC}$) pair. Broadcasting the unique number could be in binary. In this example, 5 bits are need to represent the 22 possible values of Y. One option maps the range of Y into $T_{SFC}$. Then (Y)mod $T_{SFC}$ identifies $\Delta_{SFC}$.

Suppose $T_{SFC}$ can have values from the set ($A_1, A_2, \ldots, A_N$) ms. There are $A_1+A_2+\ldots+A_N$ values for the communicated number Y. This requires ceil[$\log_2(A_1+A_2+\ldots+A_N)$] bits to represent. The values of $T_{SFC}$ and $\Delta_{SFC}$ are encoded as follows. If Y is in the range 1 to $A_1$ then $T_{SFC}$ is $A_1$. If Y is in the range $1+A_1$ to $A_1+A_2$ then $T_{SFC}$ is $A_2$. If Y is in the range $1+A_1+\ldots+A_K$ to $A_1+\ldots+A_K+A_{K+1}$ then $T_{SFC}$ is $A_{K+1}$. The value of $\Delta_{SFC}$ is determined as (Y)mod $T_{SFC}$. Any remaining values of Y which do not map into ($\Delta_{SFC}$, $T_{SFC}$) can be used to communicate re-configuration, one-shot SRS or other options.

In another embodiment of the invention, the SRS sub-frame configuration may not be exactly qui-spaced. In this embodiment introduces another parameter $\delta_{SFC}$. Then, the SRS sub-frames are the sub-frames $C_{SFC}$ for which any of the following equations hold:

$$\Delta_{SFC} = C_{SFC} \bmod T_{SFC}$$

$$1+\Delta_{SFC} = C_{SFC} \bmod T_{SFC}$$

$$2+\Delta_{SFC} = C_{SFC} \bmod T_{SFC}$$

$$\delta_{SFC}+\Delta_{SFC} = C_{SFC} \bmod T_{SFC}$$

The value of the parameter $\delta_{SFC}$ can be pre-determined and fixed. In this case the value of $\delta_{SFC}$ can be inferred from the cell ID. Alternatively, the value of $\delta_{SFC}$ can be signaled in the SIB. As a further alternative, the value of $\delta_{SFC}$ can be encoded jointly or separately with $T_{SFC}$ and $\Delta_{SFC}$.

In other embodiments of the invention, multiple values for $T_{SFC}$, $\Delta_{SFC}$ and $\delta_{SFC}$ are possible. These values can also be broadcast via SIB.

RRC signaled SRS timing parameters include: duration having a range from one-shot to infinite; periodicity indicating the SRS transmission period from the UE 109; and sub-frame offset identifying the offset within the SRS transmission period from the UE.

In a first embodiment the RRC overhead for SRS timing parameters include: duration is one-shot to infinite and can be encoded in one bit; periodicity selected from (2, 5, 10, 20, 40, 80, 160, 320) ms which can be encoded in 3 bits; and sub-frame offset which must be designed according to the worst case of the longest possible periodicity thus requiring ceil [$\log_2(320)$] or 9 bits to encode. Thus the number of UE specific bits signaled via RRC to describe the SRS configuration in this example equals 1+3+9=13 bits. Since the cell wide sub-frame configuration is separate from the UE specific parameters listed above, there are either two possibilities.

The number of bits and source encoding required for UE specific parameters could depend on the actual sub-frame configuration transmitted via SIB. For example, if the sub-frame configuration notes every sub-frame is an SRS sub-frame, then 1+3+9=13 bits are required to specify the UE specific parameters. Alternatively, if the sub-frame configuration notes that every tenth sub-frame is an SRS sub-frame, then a smaller number of bits would be required to specify the UE specific parameters. This approach is more cumbersome. It likely would require a different definition of RRC configured parameters, depending on the sub-frame configuration. This would disadvantageously further complicate the specification. The number of bits required for UE specific RRC parameters can be independent of the actual sub-frame configuration transmitted via SIB.

The worst case sub-frame configuration is when all sub-frames are SRS sub-frames. The number of RRC configured SRS timing parameters is this worst case is 1+3+9=13 bits.

Figure 5:
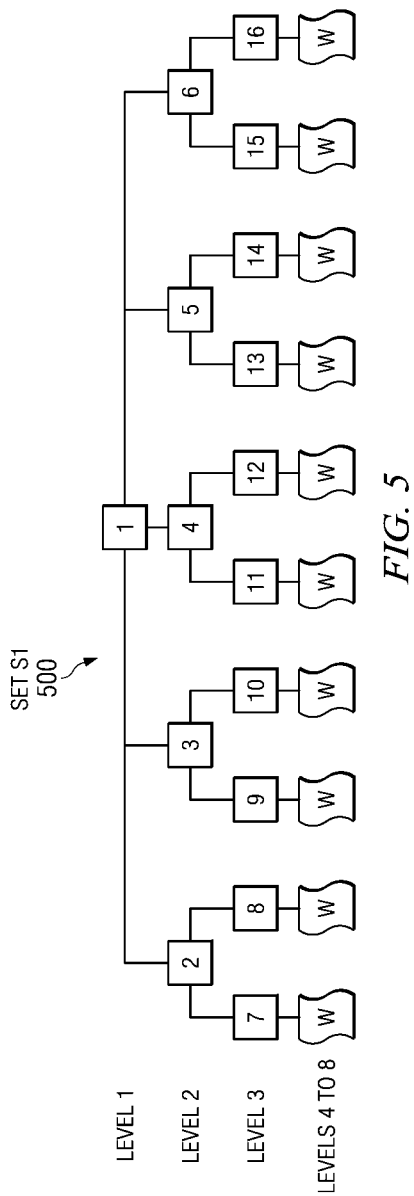
FIG. 5 illustrates a first resource sharing tree for a first set of periodicities and offsets.

In the second option there are two SRS periods that are not multiples of each other and cannot be multiplexed on a common SRS (frequency) resource. Possible SRS periods are selected from the set (2, 5, 10, 20, 40, 80, 160, 320) ms. Thus, since 2 ms and 5 ms cannot be multiplexed, any given SRS resource should be shared either with periodicities selected from the set S1 (5, 10, 20, 40, 80, 160, 320) ms or set S2 (2, 10, 20, 40, 80, 160, 320) ms. FIG. 5 illustrates a resource sharing tree 500 for set S1. Tree 500 for set S1 illustrated in FIG. 5 has 8 levels including node 1. Each W is a binary tree with 5 levels. The tree for set S1 has 1+5+10+20+40+80+160+320=636 nodes. This requires 10 bits to represent. Each node of the tree for set S1 encodes both the periodicity and the offset. There are 5 nodes at level 2 (2, 3, 4, 5, 6). Each of these nodes has a periodicity $T_{SFC}$ of 5 ms. The offset $\Delta_{SFC}$ increases from left to right via a one-to-one mapping from (2, 3, 4, 5, 6) to (0, 1, 2, 3, 4). This example is a simple subtraction of 2. Alternatively, it can be a mod 5 operation. At level 3, there are 10 nodes (7 to 16) each having a periodicity of 10 ms. Offsets $\Delta_{SFC}$ can be derived either via subtraction or a mod 10 operation as previously described.

Table 12 lists the relationship between SRS periodicity $T_{SFC}$ and the node index for set S1. The SRS periodicity $T_{SFC}$ can be extracted from the node index via a look-up table and a few comparisons. The SRS offset $\Delta_{SFC}$ can be extracted by performing (Node_Index)mod $T_{SFC}$. Thus SRS periodicity $T_{SFC}$ and the SRS offset $\Delta_{SFC}$ are easily found from node index.

TABLE 12

| | $T_{SFC}$ | | | | | | |
|---|---|---|---|---|---|---|---|
| | 5 ms | 10 ms | 20 ms | 40 ms | 80 ms | 160 ms | 320 ms |
| Node Index Range | 2-7 | 7-16 | 17-36 | 37-76 | 77-156 | 157-316 | 317-636 |

Figure 6:
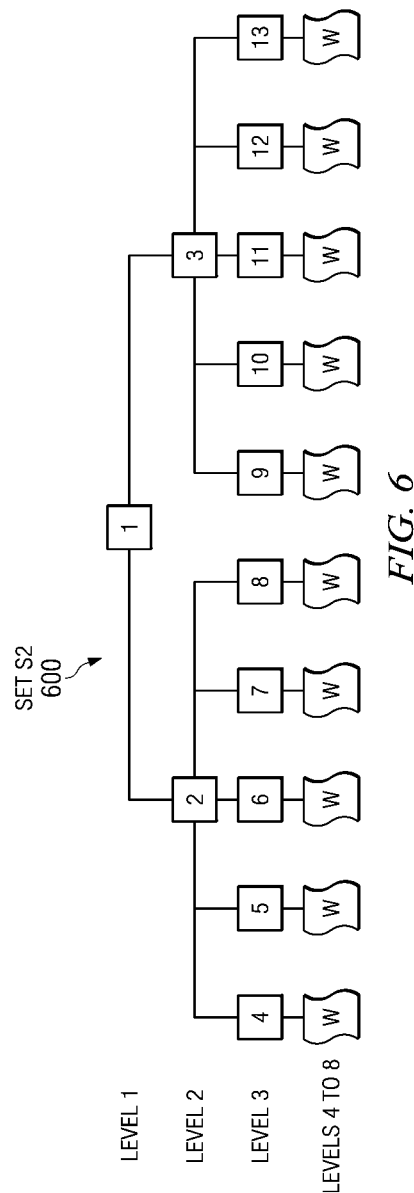
FIG. 6 illustrates a second resource sharing tree for a second set of periodicities and offsets.

FIG. 6 illustrates resource sharing tree 600 for set S2. Tree 600 for set S2 has 8 levels and each W is a binary tree with 5 levels. Tree 600 for set S1 has 1+2+10+20+40+80+160+320=633 nodes. This requires 10 bits to represent. Each node of the tree encodes both periodicity $T_{SFC}$ and offset $\Delta_{SFC}$. There are 2 nodes at level 2 (2,3) Each of these nodes has a periodicity $T_{SFC}$ of 2 ms. Offset $\Delta_{SFC}$ increases from left to right in a one-to-one mapping from (2,3) to (0,1). This could be implemented by a simple subtraction of 2. Alternatively, it can be a mod 2 operation. At level 3, there are 10 nodes (4 to 13) each having a periodicity $T_{SFC}$ of 10 ms. Offsets $\Delta_{SFC}$ can be derived either via subtraction or a mod 10 operation as previously described.

Table 13 lists the relationship between SRS periodicity $T_{SFC}$ and the node index for set S2 for two alternative codings. The SRS periodicity $T_{SFC}$ can be extracted from the node index via a look-up table and a few comparisons. The SRS offset $\Delta_{SFC}$ can be extracted by performing (Node_Index) mod $T_{SFC}$. Thus SRS periodicity $T_{SFC}$ and the SRS offset $\Delta_{SFC}$ are easily found from node index.

TABLE 13

| | | | $T_{SFC}$ | | | | |
|---|---|---|---|---|---|---|---|
| | 2 ms | 10 ms | 20 ms | 40 ms | 80 ms | 160 ms | 320 ms |
| Node Index Range | 2-3 | 4-13<br>7-16 | 14-33<br>17-36 | 34-73<br>37-76 | 74-153<br>77-156 | 154-313<br>157-316 | 314-633<br>317-636 |

The designation of which tree is used (set S1 or set S2) can be implicitly tied to some other system parameter. For example, set S1 may be used for TDD and set S2 used for FDD. This choice may be tied to some alternate system parameters, broadcast via SIB or tied to some specific values of SRS sub-frame configuration. Thus the number of required RRC signaling bits can be reduced from 13 bits to 11 bits. This is about a 15% overhead reduction. This overhead reduction carries no penalty and is achieved by employing efficient source encoding of the periodicity and sub-frame offset. This set of embodiments reduces SIB and RRC signaling overhead for parameters related to SRS timing using efficient data structures such as trees. This overhead reduction is especially important for SIB signaling due to coverage issues.

The RRC signaled UE specific SRS timing parameters of this invention include: duration from one-shot to infinite; periodicity $T_{(SFC, UE)}$ for the particular UE 109; sub-frame Offset $\Delta_{(SFC, UE)}$ within the SRS transmission period from UE 109. The UE 109 transmits SRS in sub-frames for which the counter $C_{SFC}$ satisfies $\Delta_{(SFC, UE)} = (C_{SFC}) \bmod T_{SFC, UE}$. There are several methods to signal $T_{SFC, UE}$ and $\Delta_{SFC, UE}$ to UEs 109.

In a first option defining SRS RRC timing parameters the total RRC overhead for SRS timing parameters is similar to that described above: duration is one-shot to infinite and can be encoded in one bit; periodicity selected from (2, 5, 10, 20, 40, 80, 160, 320) ms which can be encoded in 3 bits; and sub-frame offset which must be designed according to the worst case of the longest possible periodicity thus requiring ceil[$\log_2(320)$] or 9 bits to encode. Thus the number of UE specific bits signaled via RRC to describe the SRS configuration in this example equals 1+3+9=13 bits. Since the cell wide sub-frame configuration is separate from the UE specific parameters listed above, there are either two possibilities.

Table 14 lists a 5 bit example suitable for use UE specific SRS sub-frame configurations.

TABLE 14

| Decimal | Binary | $T_{SFC}$ | $\Delta_{SFC}$ |
|---|---|---|---|
| 0 | 00000 | 1 | 0 |
| 1 | 00001 | 2 | 0 |
| 2 | 00010 | 2 | 1 |
| 3 | 00011 | 5 | 0 |
| 4 | 00100 | 5 | 1 |
| 5 | 00101 | 5 | 2 |
| 6 | 00110 | 5 | 3 |
| 7 | 00111 | 5 | 4 |
| 8 | 01000 | 10 | 0 |
| 9 | 01001 | 10 | 1 |
| 10 | 01010 | 10 | 2 |
| 11 | 01011 | 10 | 3 |
| 12 | 01100 | 10 | 4 |
| 13 | 01101 | 10 | 5 |
| 14 | 01110 | 10 | 6 |
| 15 | 01111 | 10 | 7 |
| 16 | 10000 | 10 | 8 |
| 17 | 10001 | 10 | 9 |
| 18 | 10010 | 20 | 0 |
| 19 | 10011 | 20 | 1 |
| 20 | 10100 | 20 | 2 |
| 21 | 10101 | 20 | 3 |
| 22 | 10110 | 20 | 4 |
| 23 | 10111 | 20 | 5 |
| 24 | 11000 | 20 | 6 |
| 25 | 11001 | 20 | 7 |
| 26 | 11010 | 20 | 8 |
| 27 | 11011 | 20 | 9 |
| 28 | 11100 | 20 | 10 |
| 29 | 11101 | 20 | 11 |
| 30 | 11110 | 20 | 12 |
| 31 | 11111 | Inf. | 0 |

In Table 14 a coding of decimal 31 indicates no SRS thus $T_{SFC}$ is infinite, $\Delta_{SFC}$ is meaningless and not applicable (NA).

Table 15 lists a 4 bit example suitable for use UE specific SRS sub-frame configurations.

TABLE 15

| Decimal | Binary | $T_{SFC}$ | $\Delta_{SFC}$ |
|---|---|---|---|
| 0 | 0000 | 1 | 0 |
| 1 | 0001 | 2 | 0 |
| 2 | 0010 | 2 | 1 |
| 3 | 0011 | 5 | 0 |
| 4 | 0100 | 5 | 1 |
| 5 | 0101 | 5 | 2 |
| 6 | 0110 | 5 | 3 |
| 7 | 0111 | 10 | 0 |
| 8 | 1000 | 10 | 1 |
| 9 | 1001 | 10 | 2 |
| 10 | 1010 | 10 | 3 |
| 11 | 1011 | 20 | 0 |
| 12 | 1100 | 20 | 1 |
| 13 | 1101 | 20 | 2 |
| 14 | 1110 | 20 | 3 |
| 15 | 1111 | Inf. | 0 |

In Table 15 a coding of decimal 15 indicates no SRS thus $T_{SFC}$ is infinite, $\Delta_{SFC}$ is meaningless and not applicable (NA).

Table 16 lists a first 3 bit example suitable for use UE specific SRS sub-frame configurations.

TABLE 16

| Decimal | Binary | $T_{SFC}$ | $\Delta_{SFC}$ |
|---|---|---|---|
| 0 | 000 | 1 | 0 |
| 1 | 001 | 10 | 0 |
| 2 | 010 | 10 | 1 |
| 3 | 011 | 10 | 2 |
| 4 | 100 | 20 | 0 |

TABLE 16-continued

| Decimal | Binary | $T_{SFC}$ | $\Delta_{SFC}$ |
|---|---|---|---|
| 5 | 101 | 20 | 1 |
| 6 | 110 | 20 | 2 |
| 7 | 111 | 20 | 3 |
| 8 | 000 | Inf. | 0 |

In Table 16 a coding of decimal 8 indicates no SRS thus $T_{SFC}$ is infinite, $\Delta_{SFC}$ is meaningless and not applicable (NA).

Table 17 lists a second 3 bit example suitable for use UE specific SRS sub-frame configurations.

TABLE 17

| Decimal | Binary | $T_{SFC}$ | $\Delta_{SFC}$ |
|---|---|---|---|
| 0 | 000 | 5 | 0 |
| 1 | 001 | 5 | 0 |
| 2 | 010 | 5 | 1 |
| 3 | 011 | 10 | 2 |
| 4 | 100 | 10 | 0 |
| 5 | 101 | 10 | 1 |
| 6 | 110 | 20 | 2 |
| 7 | 111 | 20 | 3 |
| 8 | 000 | 20 | 0 |

In a second option, the number of bits and source encoding required for UE specific parameters could depend on the actual sub-frame configuration transmitted via SIB. For example, if the sub-frame configuration notes every sub-frame is an SRS sub-frame, then 1+3+9=13 bits are required to specify the UE specific parameters. Alternatively, if the sub-frame configuration notes that every tenth sub-frame is an SRS sub-frame, then a smaller number of bits would be required to specify the UE specific parameters. This approach is more cumbersome. It likely would require a different definition of RRC configured parameters, depending on the sub-frame configuration. This would disadvantageously further complicate the specification. The number of bits required for UE specific RRC parameters can be independent of the actual sub-frame configuration transmitted via SIB. The worst case sub-frame configuration is when all sub-frames are SRS sub-frames. The number of RRC configured SRS timing parameters is this worst case is 1+3+9=13 bits.

The number of bits required for UE specific RRC parameters can be independent of the actual sub-frame configuration as signaled by SIB. The worst case sub-frame configuration is when all sub-frames are SRS sub-frames. The number of RRC configured SRS timing parameters is this worst case is 1+3+9=13 bits.

The amount of RRC signaling overhead needed to communicate the UE specific SRS configuration can be reduced as follows. The set of SRS periods $T_{(SFC, UE)}(1) < T_{(SFC, UE)}(2) < \ldots < T_{(SFC, UE)}(K)$ has already been defined. For example, suppose this set is (2, 5, 10, 20, 40, 80, 160, 320) ms including K=8 possible SRS periods. Using this set of SRS periods, the specification can define the switch-point numbers $N(1) < N(2) < \ldots < N(K) < N(K+1)$ as follows. These numbers are defined as N(1)=0 and N(k+1) is recursively defined as $N(k) + T_{(SFC, UE)}(k)$, where integer k ranges from 1 to K. This recursion produces N(2)=2, N(3)=7, N(4)=17, N(5)=37, N(6)=(77), N(7)=(157), N(8)=317, N(9)=637 for the switching point numbers.

A configuration index N is signaled to UE 109 using the RRC. The UE 109 finds the unique index k for which $N(k) \leq N < N(k+1)$. The sub-frame period is $T_{(SFC, UE)} = T_{(SFC, UE)}(k)$ and the offset is $\Delta_{(SFC, UE)} = N - N(k)$. Thus if configuration index N=35 is signaled to UE 109, UE 109 determines $17 = N(4) \leq N < N(5) = 37$. Thus the derived index is k=4. UE 109 will use $T_{(SFC, UE)}(4) = 20$ ms and $\Delta_{(SFC, UE)} = N - N(4) = 18$.

Since the largest switch point is N(9)=637, the number of bits needed to signal the configuration is $\text{ceil}[\log_2(637)] = 10$ bits. Including the bit which selects a duration between one-shot and infinite, a total of 11 bits are needed for UE specific SRS configuration. This reduces the number of required RRC signaling bits from 13 bits to 11 bits. This is a 15% overhead reduction. This overhead reduction carries no penalty and is achieved by employing efficient source encoding of the periodicity and sub-frame offset.

In a still further embodiment of the invention, basestation 101 signals the SRS configuration index to UE 109 using DL signaling. UE 109 receives the configuration index and infers the SRS sub-frame period and the offset. This jointly encodes the SRS sub-frame period and offset in the configuration index.

In yet further embodiment of the invention, one sub-frame carries more than one sounding reference signal (SRS). For example, in evolved-UMTS radio access (EUTRA) configurations for TDD, the sub-frame carrying the UpPTS field can carry two SRS (OFDM) symbols. When using TDD, the basestation 101 informs UE 109 which OFDM symbol should be used for SRS transmission. An additional bit may be added to signal specifically which OFDM symbol of the sub-frame should be used for SRS transmission. UE 109 infers sub-frame as before, but the additional bit informs UE 109 which OFDM symbol is used for SRS transmission. For example, if this bit is 0, the first possible SRS symbol of the signaled sub-frame is used. If this bit is 1, then the second possible SRS symbol of the signaled sub-frame is used. In other embodiments, two bits are used to signal UE 109 whether first possible OFDM symbol is used for SRS, whether second possible OFDM symbol is used for SRS, or whether both possible OFDM symbols are used for SRS.

In a still further embodiment a 2-bit overhead reduction can be made by signaling the SRS periodicity $T_{SFC}$ and SRS offset $\Delta_{SFC}$ through the SRS configuration index as follows. The SRS configuration index is RRC signaled using 9 bits. UE 109 uses a look-up table to determine a range encompassing the SRS configuration index. This range is uniquely mapped to a SRS periodicity $T_{SFC}$ using the same row of the look-up table. The SRS offset $\Delta_{SFC}$ is the SRS configuration index—begin. This same signaling type can be applied to CQI reporting. Table 18 lists an example look-up table.

TABLE 18

| SRS Configuration Index Range Begin to End | | |
|---|---|---|
| Begin | End | $T_{SFC}$ |
| 0 | 1 | 2 |
| 2 | 6 | 5 |
| 7 | 16 | 10 |
| 17 | 36 | 20 |
| 37 | 76 | 40 |
| 77 | 156 | 80 |
| 157 | 316 | 160 |

Consider the following example. A Example: SRS configuration index of 58 is signaled from basestation 101 to UE 109. Table 18 shows that index 58 falls within the range 37 to 76. This row lists a SRS periodicity $T_{SFC}$ of 40 ms. Offset SRS offset $\Delta_{SFC}$ is the signaled index 58 minus the range beginning of 37.

This invention exploits possibilities of reducing UE specific RRC signaling overhead for parameters related to SRS.

What is claimed is:

1. A method, comprising:
   transmitting to a user equipment within a corresponding cell a sounding reference signal (SRS) sub-frame configuration (SFC) indicating a periodicity $T_{SFC}$ and an offset $\Delta_{SFC}$ for determinining sub-frames when sounding is permitted, wherein said transmitting said SRS SFC includes separately coding said periodicity $T_{SFC}$ and said offset $\Delta_{SFC}$.

2. A method comprising:
   transmitting to a user equipment within a corresponding cell a sounding reference signal (SRS) sub-frame configuration (SFC) indicating a periodicity $T_{SFC}$ and an offset $\Delta_{SFC}$ for determining sub-frames when sounding is permitted, wherein said transmitting said SRS SFC includes jointly coding said periodicity $T_{SFC}$ and said offset $\Delta_{SFC}$.

3. The method of claim 2, wherein:
   said jointly coding said periodicity $T_{SFC}$ and said offset $\Delta_{SFC}$ includes
   determining a set of K possible periodcities $T_{SFC}$,
   disposing said set of possible periodicities $T_{SFC}$ in a monotonically increasing array of K elements $T_{SFC}(k)$,
   recessively defining a set of switch points N where $N(0)=0$ and $N(k+)=N(k)+T_{SFC}(k)$, and
   transmitting an configuration index N; and
   said step of recognizing said sounding reference signal sub-frame configuration includes
   finding a unique index k for which $N(k) \leq N < N(k+1)$,
   determining the periodicity $T_{SFC}$ to be $T_{SFC}(k)$, and
   determining the offset $\Delta_{SFC}$ to be $N-N(k)$.

4. A method, comprising:
   receiving a sounding reference signal (SRS) sub-frame configuration (SFC) indicating a periodicity $T_{SFC}$ and an offset $\Delta_{SFC}$ for determining when sounding is permitted; and
   sounding only if $\Delta_{SFC}$ = (sub-frame number) mod $T_{SFC}$.

5. The method of claim 4, wherein:
   said SRS SFC includes separately coded periodicity $T_{SFC}$ and offset $\Delta_{SFC}$.

6. The method of claim 4, wherein:
   said SRS SFC includes jointly coded periodicity $T_{SFC}$ and offset $\Delta_{SFC}$.

7. The method of claim 6, wherein:
   said jointly coded periodicity $T_{SFC}$ and offset $\Delta_{SFC}$ are coded in 4 bits as follows:

| Decimal | Binary | $T_{SFC}$ | $\Delta_{SFC}$ |
|---|---|---|---|
| 0 | 0000 | 1 | 0 |
| 1 | 0001 | 2 | 0 |
| 2 | 0010 | 2 | 1 |
| 3 | 0011 | 5 | 0 |
| 4 | 0100 | 5 | 1 |
| 5 | 0101 | 5 | 2 |
| 6 | 0110 | 5 | 3 |
| 7 | 0111 | 10 | 0 |
| 8 | 1000 | 10 | 1 |
| 9 | 1001 | 10 | 2 |
| 10 | 1010 | 10 | 3 |
| 11 | 1011 | 20 | 0 |
| 12 | 1100 | 20 | 1 |
| 13 | 1101 | 20 | 2 |
| 14 | 1110 | 20 | 3 |
| 15 | 1111 | Inf. | 0 | where: coding of decimal 15 indicates no SRS thus $T_{SFC}$ is infinite, $\Delta_{SFC}$ is meaningless and not applicable (NA).

8. The method of claim 6 wherein:
   said SRS SFC is transmitted via a broadcast System Information Block (SIB).

9. The method of claim 6, wherein:
   said SRS SFC is transmitted via a radio resource control (RRC).

10. The method of claim 6, wherein:
    said SRS SFC is transmitted via a downlink (DL) signaling.

11. The method of claim 4, wherein said receiving is performed in a user equipment.

12. The method of claim 11, wherein said user equipment operates according to a Evolved Universal Terrestrial Radio Access time division duplex frame structure where each sub-frame may carry two sounding reference signals; and
   said SRS SFC includes an orthogonal frequency division multiplexing symbol.

13. A user equipment, comprising:
    means for receiving a SRS SFC for determining sub-frames when sounding is permitted including a periodicity $T_{SFC}$, and an offset $\Delta_{SFC}$; and
    means for sounding only at sub-frames when sounding is permitted according to a recognized SRS SFC and sounding only if $\Delta_{SFC}$=(sub-frame number) mod $T_{SFC}$.

14. The method of claim 2, wherein:
    said jointly coding said periodicity $T_{SFC}$ and said offset $\Delta_{SFC}$ are coded in 4 bits as follows:

| Decimal | Binary | $T_{SFC}$ | $\Delta_{SFC}$ |
|---|---|---|---|
| 0 | 0000 | 5 | 1 |
| 1 | 0001 | 5 | 1, 2 |
| 2 | 0010 | 5 | 1, 3 |
| 3 | 0011 | 5 | 1, 4 |
| 4 | 0100 | 5 | 1, 2, 3 |
| 5 | 0101 | 5 | 1, 2, 4 |
| 6 | 0110 | 5 | 1, 3, 4 |
| 7 | 0111 | 5 | 1, 2, 3, 4 |
| 8 | 1000 | 10 | 1, 2, 6 |
| 9 | 1001 | 10 | 1, 3, 6 |
| 10 | 1010 | 10 | 1, 6, 7 |
| 11 | 1011 | 10 | 1, 2, 6, 8 |
| 12 | 1100 | 10 | 1, 3, 6, 9 |
| 13 | 1101 | 10 | 1, 4, 6, 7 |
| 14 | 1110 | reserved | reserved |
| 15 | 1111 | reserved | reserved | where: SRS subframes satisfy $|n_s/2|$ mod $T_{SFC} \in \Delta_{SFC}$.

15. The method of claim 2, wherein:
    said jointly coding said periodicity $T_{SFC}$ and said offset $\Delta_{SFC}$ are coded in 4 bits as follows:

| Decimal | Binary | $T_{SFC}$ | $\Delta_{SFC}$ |
|---|---|---|---|
| 0 | 0000 | 1 | 0 |
| 1 | 0001 | 2 | 0 |
| 2 | 0010 | 2 | 1 |
| 3 | 0011 | 5 | 0 |
| 4 | 0100 | 5 | 1 |

-continued

| Decimal | Binary | $T_{SFC}$ | $\Delta_{SFC}$ |
|---|---|---|---|
| 5 | 0101 | 5 | 2 |
| 6 | 0110 | 5 | 3 |
| 7 | 0111 | 5 | 0, 1 |
| 8 | 1000 | 5 | 2, 3 |
| 9 | 1001 | 10 | 0 |
| 10 | 1010 | 10 | 1 |
| 11 | 1011 | 10 | 2 |
| 12 | 1100 | 10 | 3 |
| 13 | 1101 | 10 | 0, 1, 2, 3, 4, 6, 8 |
| 14 | 1110 | 10 | 0, 1, 2, 3, 4, 5, 6, 8 |
| 15 | 1111 | reserved | reserved | where: SRS subframes satisfy $\lfloor n_s/2 \rfloor \bmod T_{SFC} \in \Delta_{SFC}$.

* * * * *